United States Patent [19]

Boehringer

[11] 4,068,770

[45] Jan. 17, 1978

[54] FOLDABLE INCLINED MULTI-SECTION RAMP ACTUATION SYSTEM

[75] Inventor: Wilfred E. Boehringer, Fullerton, Calif.

[73] Assignee: McDonnell Douglas Corporation, Long Beach, Calif.

[21] Appl. No.: 690,637

[22] Filed: May 27, 1976

[51] Int. Cl.² .............................................. B60P 1/00
[52] U.S. Cl. ...................................... 214/85; 14/71.1; 182/94; 160/213
[58] Field of Search ........................ 214/85, 85.1, 770; 244/129 D, 137 R; 182/95, 106, 88, 94; 14/71.1, 69.5, 71.3; 296/61, 62; 280/166; 74/505, 506, 519, 521, 522; 52/121, 71, 506; 212/58 A, 59, 46; 254/143, 148

[56] References Cited

U.S. PATENT DOCUMENTS

| | | | |
|---|---|---|---|
| 2,558,975 | 7/1951 | Moreno et al. | 182/95 |
| 3,028,018 | 4/1962 | Mott | 212/46 R |
| 3,664,516 | 5/1972 | Goudy | 212/144 |
| 3,733,758 | 5/1973 | Maier et al. | 52/121 |
| 3,785,462 | 1/1974 | Coad et al. | 254/148 |
| 3,799,479 | 3/1974 | Roeder et al. | 244/137 R |
| 3,936,034 | 3/1976 | Larralde | 254/190 R |

FOREIGN PATENT DOCUMENTS 856,627  12/1960  United Kingdom ................. 214/770

*Primary Examiner*—Lawrence J. Oresky
*Assistant Examiner*—Lawrence E. Williams
*Attorney, Agent, or Firm*—Henry M. Bissell

[57] ABSTRACT

A foldable, articulated inclined ramp or stair assembly actuation system is shown and described. The assembly comprises at least three elements connected by hinges to each other and foldable on each other under the control of a series of pulleys interconnected by a single drive cable. A method of operating the arrangement is described whereby an orderly folding sequence is automatically maintained by the actuating means. The assembly is suitable for installation within an aircraft and may be power driven to extend and retract through a loading door, thus obviating the need for any ground equipment for the purpose.

32 Claims, 9 Drawing Figures

U.S. Patent  Jan. 17, 1978  Sheet 1 of 3  4,068,770
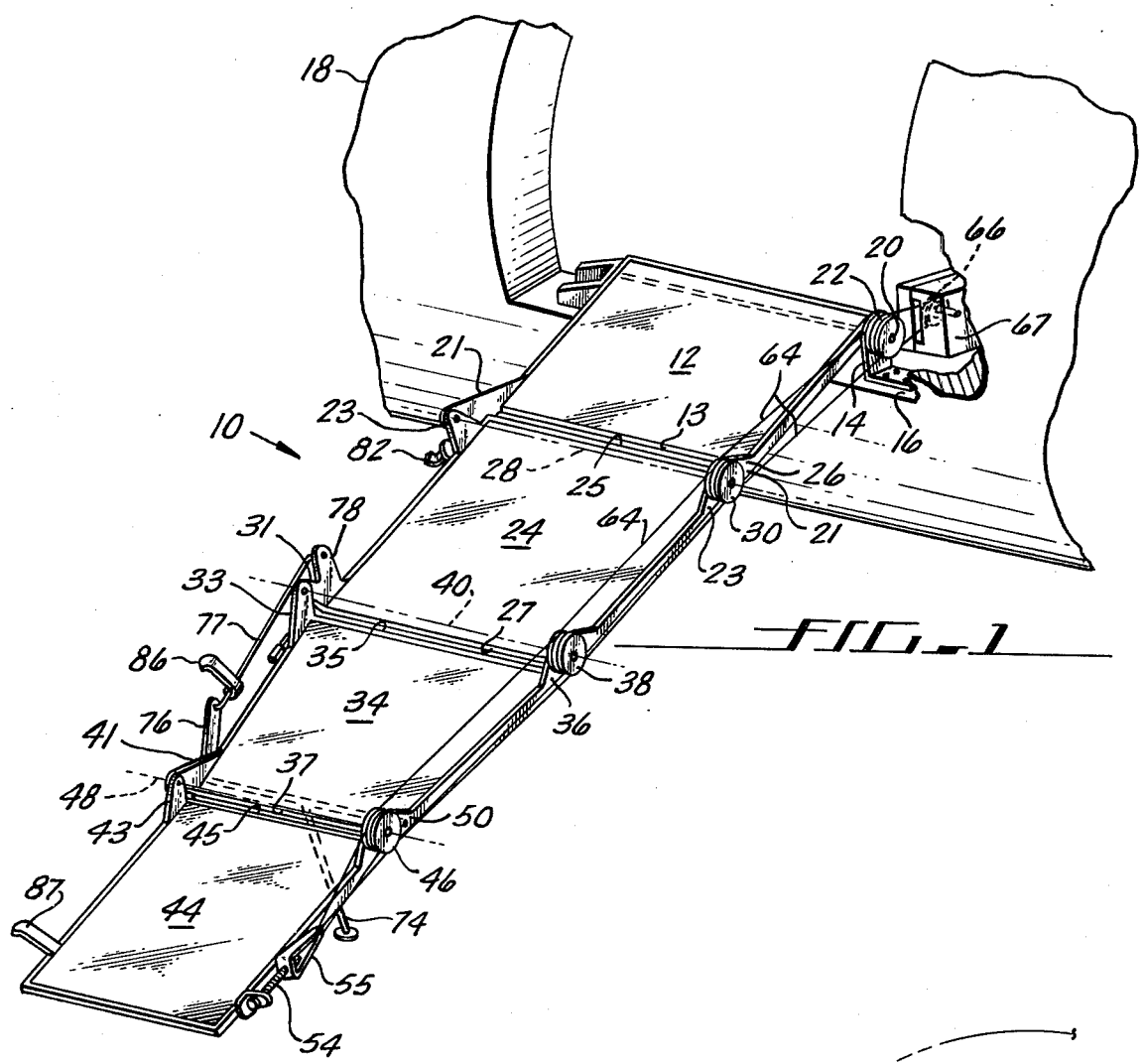
FIG_1
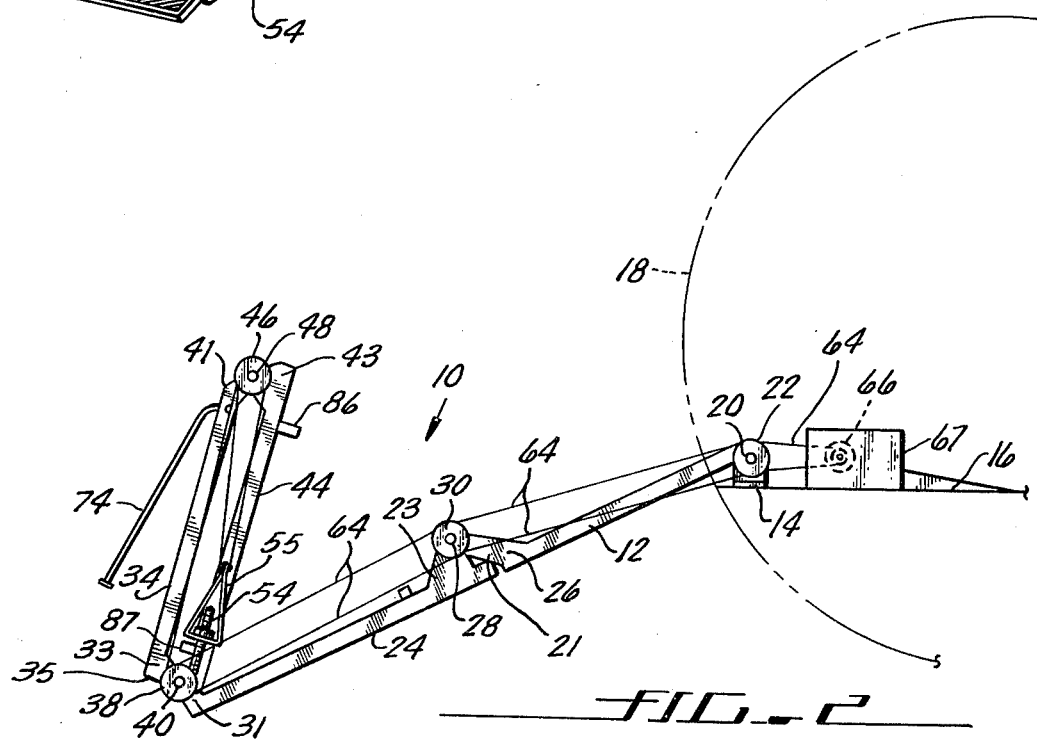
FIG_2

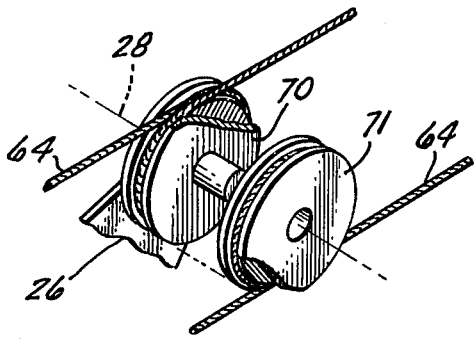
FIG_2A
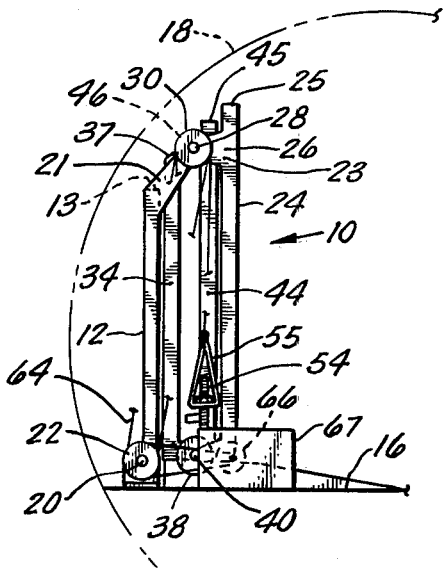
FIG_3
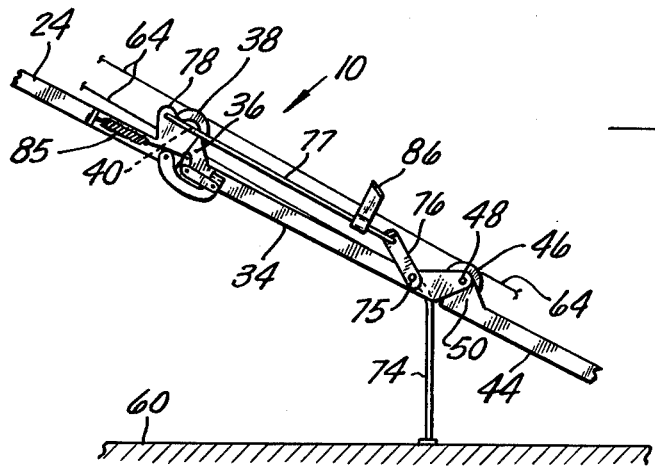
FIG_4
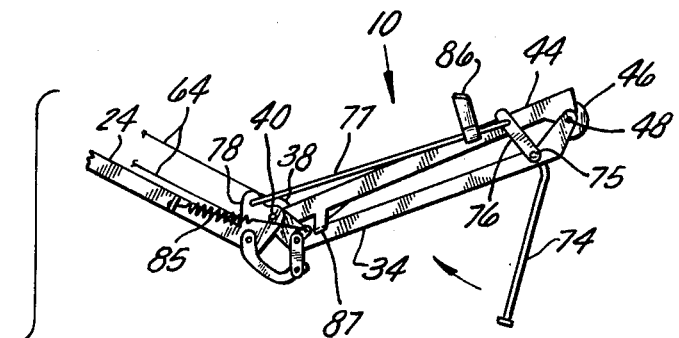
FIG_5
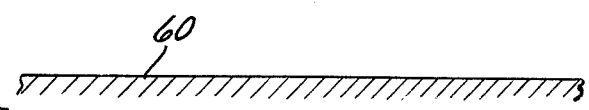

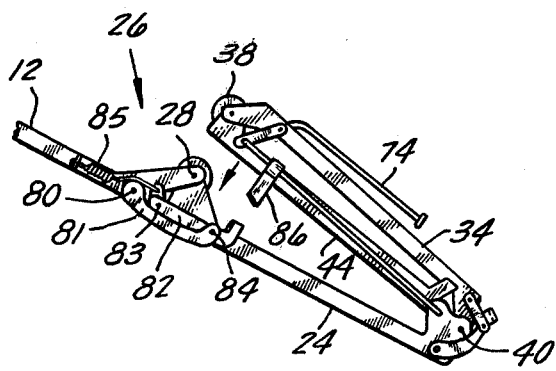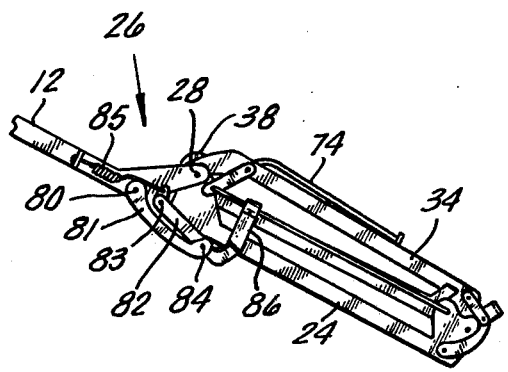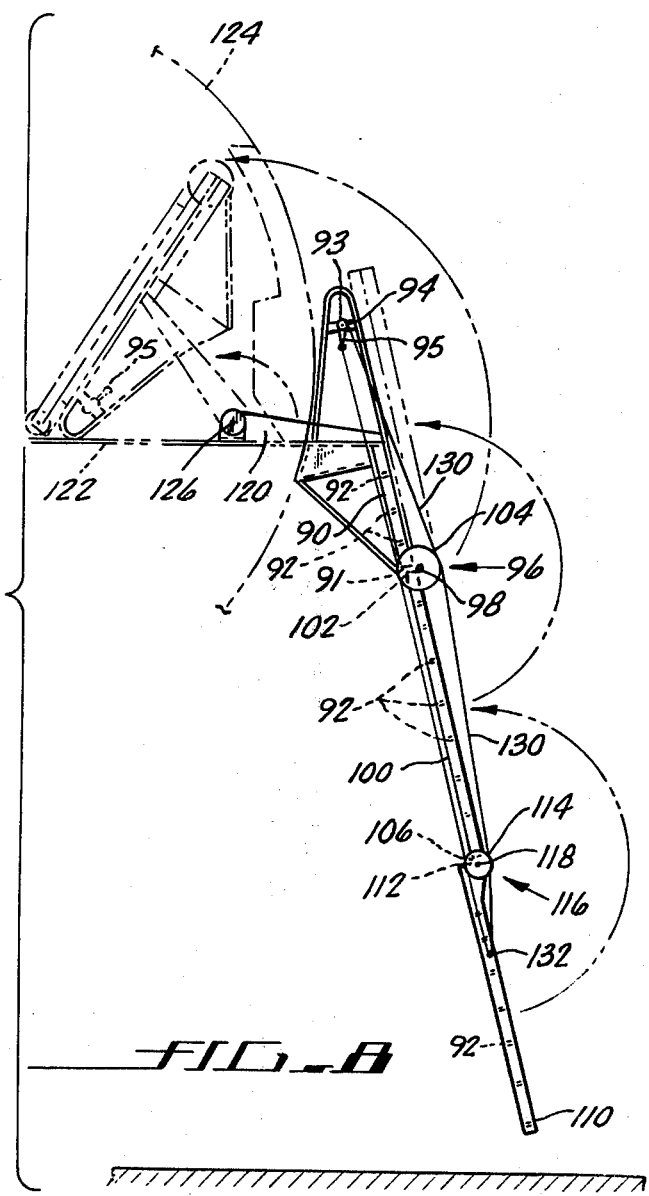

FOLDABLE INCLINED MULTI-SECTION RAMP ACTUATION SYSTEM

BACKGROUND OF THE INVENTION

1. Field of the Invention

This invention relates to an actuation system for multi-section devices, such as self-contained ramps and ladders mounted within transport vehicles for providing loading and unloading of cargo and passengers when the vehicle is stationary.

2. Description of the Prior Art

It has long been known to provide a multi-section ramp or stairway assembly which can be wholly contained within a transportation vessel or vehicle such as an airplane or a ship. U.S. Pat. No. 2,933,149 of Lee, representative of known prior art in this field, discloses a self-contained stair unit for extension from an aircraft by means of a series of linkages and levers. Such units as are known typically involve rotation in both the clockwise and counterclockwise direction about various axes of rotation along the extended, articulated stair assembly. It has also been known before to actuate the extension and retraction of the stairway assembly by the movement of a cable attached to pulleys which are capable of rotating the articulated assembly as desired by means of various mechanical linkages. A cable assembly actuating arrangement representative of the prior art is seen in U.S. Pat. No. 2,531,263 of Fink et al. Another representative patent showing such cable actuation of the rotation of the various sections of the stairway assembly about respective axes of rotation can be seen in U.S. Pat. No. 3,083,784 of Uriah. In such arrangements, it is characteristic that the assembly will fold or unfold in zigzag fashion by rotating about adjacent axes of rotation in opposite directions.

SUMMARY OF THE INVENTION

The present invention contemplates the provision of a multi-section stair or ramp assembly comprising a plurality of individual sections, each adjacent pair of which is joined together by a hinge arrangement to permit folding of the two sections together. Each individual section has an offset hinge bracket of sufficient dimension to permit the adjacent outboard section and the other, more outboard sections folded thereagainst to be folded up against the individual section about the hinge axis. A multiple pulley and cable arrangement is connected to a drive mechanism such as a motor to fold and unfold the ramp. It is to be understood herein that the term "ramp" is used to mean a sloping way such as a sloping floor leading from one level to another or a stairway or ladder for entering or leaving the main doors of aircraft or similar transportation vehicles. A pair of pulleys is mounted at each hinge axis between adjacent sections and also at the pivot axis of suspension of the ramp in a vehicle. The pulleys are free to rotate upon their axes and are offset from each other to avoid interference when the ramp sections are folded together. A cable having its opposite ends wound about and attached to a drum mounted on the power drive shaft is wound about all of the pulleys such that a moment is developed on each section equal to the pulley radius times the force in the cable. As tension is placed on one end of the cable by the drive shaft to effect folding of the ramp, force is developed at the farthest extended section which causes it to rotate about the next upstream pulley and hinge axis. Unfolding is effected by developing tension in the other cable which applies a force at the outer inboard folded section, causing it and all other folded sections to rotate about its inboard hinge axis. For ramps not cantilevered from one end, each hinge mechanism is provided with a mechanical toggle and toggle release member so that the hinge mechanism is locked open against folding except when that particular hinge mechanism is to be used as the pivot axis in the folding sequence. At least one of the outer sections is provided with a pivotable support member coupled by a linkage mechanism to the next inboard section and driven between retracted and extended positions thereby as the outer section folds and unfolds relative to the next inboard section.

Particular arrangements of the multi-section actuation system in accordance with the present invention have particular applicability in recently developed aircraft which are designed to operate independently of ground equipment and therefore require self-contained stairways or ramps. This is particularly true for aircraft that are relatively high off the ground and require more than one or two folding sections. By virtue of the folding and unfolding design of the present invention, the actuating system may be made lighter and more efficient than previously known devices. In the presented arrangement, only one section is moved against resisting forces at any given time. Thus the sizes of the various pulleys may be tailored to generate an efficient overall load stroke curve within the limits of the available actuating power source capability. System simplicity and reliability are enhanced by the use of the closed loop cable system to drive the ramp, a considerable improvement over previously known ramp devices which require multiple hydraulic cylinders and related equipment to transfer hydraulic fluid pressure across folding joints.

In accordance with an aspect of the present invention, the respective ramp sections fold in a manner such that the first section which is folded, ends up in the center of the folded stack. Ramp actuating force is provided through a closed loop cable system powered by a single actuator. At each ramp hinge pivot, there are two freely rotating pulleys with a 360° cable wrap. The wrap on the two pulleys is in opposite directions to provide extending and retracting forces. During retraction, the pulleys which are upstream of the folding ramp section will idle with cable motion. As the sections are folded and stopped by the section ahead of it, the cable motion and pulley motion at that hinge are also stopped. This action provides an automatic sequencing of ramp sections by the increase in hinge moment required to lift a section out of sequence. With proper sizing of the respective pulleys in order to maintain an efficient load stroke curve, it requires twice the power to lift two sections out of sequence as it does to lift both in proper sequence. To extend the ramp, the sections are trapped, one inside the other, thus providing correct sequencing in the extension direction.

One preferred embodiment of the invention establishes the sections, when extended, as a unitary, colinear inclined ramp (the conventional ramp) suitable for installation in aircraft such as are provided with hospital beds and medical attendants for use in aero-medical evacuation work, the transporting of hospital patients, and the like. Such a configuration is suitable for on-and-off loading of patients in wheelchairs, on hospital gurneys, on stretchers, and the like.

An alternative arrangement in accordance with the present invention provides an inclined ramp with stair-step configured sections for the traversal of crew and/or passengers to and from the aircraft. In both embodiments, the ramp is supported at one end on the aircraft. The actuation system can be applied to any multiple element extendible unit for use in similar fashion.

BRIEF DESCRIPTION OF THE DRAWINGS

A better understanding of the present invention may be had from a consideration of the following detailed description taken in conjunction with the accompanying drawings, in which:

FIG. 1 is a perspective view of the overall ramp extended from the aircraft in one preferred embodiment of the invention;

FIG. 2 is a side elevational view of the embodiment of FIG. 1 in partially extended position, showing details of one particular pulley system employed;

FIG. 2A illustrates an alternative embodiment of a pulley system as seen in FIG. 2;

FIG. 3 is a side elevational view of the ramp of FIGS. 1 and 2 in retracted position for storage in the associated aircraft;

FIG. 4 is a partial side elevational view of a ramp support mechanism, as seen from the opposite side of the embodiment of the invention as seen in FIG. 1;

FIG. 5 illustrates the ramp support mechanism of FIG. 4, having the ramp and ramp leg support partially retracted;

FIG. 6 illustrates details of a hinge lock mechanism in a locked mode;

FIG. 7 illustrates details of the hinge lock mechanism of FIG. 6 in an unlocked mode; and FIG. 8 is a side elevational view of an alternative, stair-step or ladder variation of the embodiment of FIG. 1.

DESCRIPTION OF THE PREFERRED EMBODIMENTS

As seen in the accompanying drawings, particularly FIG. 1, a ramp 10 is shown comprising a plurality of individual sections. A first section 12 is seen connected by a hinge mechanism 14 to a floor or platform 16 of the transportation vehicle, such as an airplane 18. The first ramp section 12 is mounted for rotation about axis 20 which constitutes part of the hinge 14. Pulley 22 rotates about axis 20 in the hinge 14 arrangement.

As seen in the view of FIG. 1, the ramp 10 also comprises a second section 24 which is connected to the first ramp 12 by virtue of hinge arrangement 26. Second ramp section 24 is mounted for rotation about an axis 28. Pulley 30 also rotates about axis 28. The second ramp section 24 is connected in the hinge arrangement 26 so that second ramp section 24 is pivotably connected to move about axis 28 of rotation free of the pulley 30.

The multi-section ramp 10 is shown in the preferred embodiment having a third section 34. Third ramp section 34 is connected by hinge arrangement 36 to second ramp section 24. Third ramp section 34 rotates about axis 40. Pulley 38 also is capable of rotating about axis 40 relative to second ramp section 24. Second ramp section 24 is attached to third ramp section 24 pivotably within the hinge 36, so that when the third ramp section 34 and pulley 38 are being rotated about axis 40, second ramp section 24 may remain stationary.

Additionally, further ramp sections may be made part of the ramp assembly 10 depending on the distance which is to be covered by the sloping ramp 10. In the particular embodiment shown in FIGS. 1-3 of the drawings, a fourth ramp section 44 is shown. Fourth ramp section 44 rotates about axis 48. Both the pulley 46 and the fourth ramp section 44 are adapted to be rotated independently about the axis 48 of hinge mechanism 50. The third ramp section 34 is connected to the fourth ramp section 44 through the hinge arrangement 50, so that fourth ramp section 44 and pulley 46 may be rotated about axis 48 independently of third ramp section 34.

Additionally, fifth ramp section and further ramp sections may be added to the ramp assembly 10 as desired. In the view of the embodiment seen in FIG. 1 in the drawings, only four ramp sections are seen. A pulley attached to a fifth ramp section could be provided, if desired, so as to connect the movement of such a fifth ramp section about an axis of rotation with the automatic movement of the first, second, third and fourth ramp sections by common cable means.

Cable 64 is adjustably affixed at one end to an adjusting screw 54 which itself is attached to the fourth section 44. Thus, both ends of the cable 64 can be stretched or loosened by working of the screw 54. In such a manner, the final adjustment of the tension within the cable can be made and can be altered as seen fit by maintenance crew.

The cable is wound about pulley 46, thence wound about pulley 38, thence wound about pulley 30, thence wound about pulley 22, thence wound about drum or axle 66. All windings of cable 64 are 360° wraps. Between adjustment screw 54 and drum 66, the windings are in the same direction so that this portion of cable 64 constitutes the upper strand as seen in the drawings. After being wound about drum 66, the cable is wound again around pulley 22 in a 360° wrap, but in the opposite direction of the first wrap or wind. Then the cable 64 is wound around pulleys 30, 38, and 46 in succession, each in the opposite direction to the first wrap so that the return portion of cable 64 consitutes the lower strand. The cable 64 is then connected to adjustment screw 54 on fourth ramp section 44.

As can be seen in the accompanying drawings, the cable 64 as it leads from the fourth ramp section 44 inboard is wound around the respective pulleys in opposite rotational direction from the other portion of the cable 64 leading toward the fourth ramp section 44. Thus, upon rotation of the drum 66, the pulleys 22, 30, 28, 46 are rotated uniformly in one rotational direction identical to the rotational direction of the drum 66. It may be observed that in the embodiment of FIG. 1 of the drawings, the drum 66 and the axes 20, 28, 40, 48 of rotation are all parallel. The movement of the respective pulleys 22, 30, 38, 46 is always in the direction identical with each other by virtue of the connection of the cable 64 and its threading about the various pulleys and the drum 66. Drum 66 can be rotated by a motor 67 as shown, or by manual rotation as desired. Mechanical advantage can be provided a manual operator by gearing linkage in the usual manner.

It is not necessary that the pulleys around which the cable 64 is wound between the various sections necessarily be a single pulley. It is contemplated, for example, that two pulleys may be provided between each of the sections, one each for the upper strand and the lower strand wraps. As may be seen better in FIG. 2A of the drawings, hinge mechanism 26 may have pulleys 70 and 71 mounted to rotate about rotation axis 28. The upper strand may be wound around one pulley 70 in a 360° wrap as shown. The lower strand of cable 64 will be wrapped around pulley 71, likewise in a 360° wrap. The pulleys 70 and 71 may have axially mounted between them a bushing, not shown, to prevent the abutting of the two pulleys. Similar to the pulleys 30, 38, 46 and 22 about their corresponding axes of rotation, pulleys 70 and 71 are mounted to be free idling pulleys on the axis 28.

Third section 34 is provided with a ramp support leg 74, as best seen in FIGS. 4 and 5 of the accompanying drawings. FIG. 4 is a partial view of FIG. 1 taken from the opposite side of the ramp assembly 10 as seen in FIGS. 1 and 2, showing ramp section 34 and portions of ramp sections 24 and 44. Ramp support leg 74 is fixed to axle 75 which is rotatingly mounted within section 34. The axle 75 is parallel to the axes 48 and 40. A crank or lever 26 is affixed at one end of the axle 75. The crank 76 is connected by a tie rod 77 to a fixed point 78 on the second section 24. The fixed point 78 must be positioned longitudinally along the ramp section 24 offset from the axis 40.

FIG. 5 is a partial view of the ramp assembly 10 showing ramp section 34 partially rotated about the axis 40. The operation of the ramp support leg in cooperation with the rest of the elements of the ramp assembly 10 will be explained in greater detail below.

It is contemplated that the various sections are locked into their extended positions so that in the extended mode, the sections will not rotate about their corresponding axes of rotation. This further aspect may be appreciated with reference to FIGS. 6 and 7 of the accompanying drawings. Again, like reference numerals are used in FIGS. 6 and 7 to denote similar or identical elements as found in FIGS. 1-4 of the drawings, for simplicity of understanding of the invention.

The first ramp section 12 is seen in FIG. 6 in the extended position abutting the extended second ramp section 24. A hinge arrangement 26 is shown having rotation axis 28 between the first ramp section 12 and second ramp section 24. The third ramp section 34 is shown in the process of being rotated about its rotation axis 40. A first link 81 is shown pivotably attached at point 80 to first section 12. A second link 82 is shown pivotably attached at point 83 to second section 24. The first bar 81 and the second bar 82 are pivotably attached to each other at an apex 84 in a toggle joint arrangement such that the apex 84 will go over center and create a latch between sections 12 and 24. It is to be noted that the first link 81 is relatively longer than the second link 82.

The toggle link mechanism is placed on the lower side of the sections 12 and 24 so that when the second section 24 is rotated into the extended position, it comes to rest in abutment with section 12, and the apex 84 comes to a rest slightly higher than the line connecting the pivotal point 80 and pivotal point 83. To provide assurance that the apex 84 will go over center and come to a rest at a point somewhat higher than this line, a spring 85 is connected between the arm 82 and the first section 12. Tension is thus provided tending to rotate arm 82 in the counterclockwise direction about pivotal point 83, as seen in FIGS. 6 and 7 of the accompanying drawings. The second section 24 is then locked from any rotation either in the clockwise or counterclockwise directions until the apex 84 of the toggle joint is dislodged from its resting position.

An arm 86 is provided on the third section 34. When the third section 34 is rotated as indicated by the arrow in FIG. 6 of the accompanying drawing, into a position adjacent the second section 24, the arm 86 will engage the bumper or link 82 so as to dislodge the apex 84 against the tension of the spring 85. The toggle joint will then be forced into an unlocked position as shown in FIG. 7. As the drum 66 is rotated in a manner so as to fold the multi-sections into adjacent relationship with each other, second section 24 may be rotated without hindrance from the unlocked toggle joint between the first section 12 and the second section 24. The details of the rotation of the various sections into and away from each other will be explained in greater detail below. In the manner as explained, however, it can be seen that rotation of second section 24 about rotation axis 28 cannot commence until the third section 34 comes to a rest adjacent second section 24, and the arm 86 unlocks the toggle joint as seen in FIG. 7.

In such a manner, the folding and the unfolding of the ramp sections is accomplished in a sequential order. In a similar manner, an identical toggle joint may be arranged between second section 24 and third section 34 in the hinge arrangement 36. A lever arm 87 is fixed on fourth section 44, so as to engage the apex, not shown, of the similar toggle joint in hinge arrangement 36.

In operation, the various sections of the multi-section ramp assembly 10 can be folded by rotating the ramp sections about various axes of rotation until the entire ramp assembly is folded with the various ramp sections adjacent each other. Rotation of the folded assembly is continued about axis 20 into or within the aircraft 18 as seen in FIG. 3 of the accompanying drawings. Positions of the various sections of the ramp assembly 10 during operation can be better seen in FIG. 2 of the accompanying drawings.

Upon rotation of drum 66, as explained above, each of the pulleys 22, 30, 28, 46 is rotated in the same rotational direction about its corresponding axis of rotation, by virtue of the movement of cable 64. If, as seen in the view of FIG. 1 of the accompanying drawings, drum 66 is rotated in the clockwise direction, the pulleys 22, 30, 38, 46 are all driven in the clockwise direction about their corresponding axes of rotation. The cable 64, upon the clockwise rotation of drum 66, increases in tension along its upper length, pulling against the anchor member 55 and applying a clockwise moment to the ramp section 44 about the pulley 46. The opposing torques at the various hinge axes, resulting from the respective cantilever loads of the various sections, are such that the farthest outboard section is lifted and rotated about its adjacent hinge axis. Also, for ramps not wholly supported by the upper end, the remaining inboard sections 34 and 24 are prevented from rotating about their corresponding rotation axes 40 and 28 by virtue of the toggle joint hinge locking mechanism described above in regard to FIGS. 6 and 7. The result is the rotation of the fourth ramp assembly 44 in a clockwise direction about axis 48 of rotation. The clockwise rotational movement of the fourth ramp section 44 continues until it is folded against the third ramp section 34, at which point arm 87 unlocks the toggle joint arrangement of hinge mechanism 36 (FIG. 6), permitting rotation of the next section.

If the drum 66 continues to be rotated in the clockwise direction, the upper strand of cable 64 between pulley 38 and pulley 46 can be seen to be increasing in tension or tending to be shortened in length, while complementally the lower strand of cable 64 between the same two pulleys 38, 46 can be seen to be decreasing in tension and tending to be increasing in length. Such a result has the effect of urging both ramp sections 34 and 44 in the clockwise direction about axis 40 of rotation, as illustrated in FIG. 2 of the drawings. The third ramp section 34 and folded fourth ramp section 44 are moved in the clockwise direction about rotation axis 40 until both ramp sections 34, 44 come into an adjacent relationship with second ramp section 24. Axis 40 is offset from the ramp sections slightly so that the folded fourth ramp section 44 and third ramp section 34, when folded into adjacent relationship with the second ramp section 24, will be substantially parallel to the second ramp section 24 and thus occupy the minimum amount of volume or space.

When the folded third section 34 and fourth section 44 are rotated about axis 40, tie rod 77, fixed to stationary second section 24, forces the crank or lever 76 to remain in a defined position relative to the axis 40. Consequently, in the counterclockwise rotation of the folded third and fourth sections 34, 44 as seen in FIGS. 4 and 5, third section 34 will appear to rotate relative to axle 75. Ramp support leg 74 then comes into adjacent relationship with third section 34 as indicated by the arrow in FIG. 5. Third section 34 may be grooved or recessed so that when leg 74 comes into adjacent relationship with the third section 34, the leg 74 may fit within the recess or groove. Rotation of third section 34 in the opposite or clockwise direction as seen in FIGS. 4 and 5, will cause the leg 74 to extend relative to the third section 34, providing that the second section 24 remains stationary. The second section will remain stationary by virtue of the lock mechanism of hinge arrangement 26, as explained above.

Again and similar to the operations of the more extended ramp section 34, 44, the continued rotation of drum 66 increases tension and tends to shorten the length of the upper strand of cable 64 between the pulley 30 and pulley 38, while reducing tension and tending to extend the length of the lower strand of cable 64 between the same two pulleys 30, 38. The result of this force on the upper strand of cable 64 between the pulleys 30, 38 is to urge the folded second, third and fourth sections 24, 34, 44 of the ramp assembly in a clockwise rotation about axis 28, referring now to FIGS. 1-3. Again, the folded second, third and fourth sections 24, 34, 44 of the ramp assembly continue in this clockwise rotation until the three folded sections become folded adjacent to first ramp section 12. The axis 28 of rotation is also offset slightly from the ramp sections 12, 24, so that when the second ramp section 24, third ramp section 34 and fourth ramp section 44, all folded adjacent each other, are rotated about axis 28 of rotation into adjacent relationship with the first ramp section 12, the second ramp section 24, third ramp section 34 and fourth ramp section 44 all will be substantially parallel to the first ramp section 12.

The continued rotation of drum 66 tends to place a tension on the upper strand of cable 64 between the pulley 22 and pulley 30, and to create a reduced tension in the lower strand of cable 64 between the same pulleys 22 and 26. The folded first, second, third and fourth sections 12, 24, 34, 44 are urged thus in a clockwise rotation about axis 20. The rotation of the folded sections of the ramp assembly continues in the clockwise direction about axis 20 until the entire assembly thus folded has been rotated to within the confines of the vehicle, such as aircraft 18 as seen in FIG. 3 of the drawings. The rotation should continue until such time as further rotation is prevented by some suitable stop, not shown.

In extending the ramp sections from their folded position as seen in FIG. 3 of the drawings, back to the extended position as seen in FIG. 1 of the drawings, the drum 66 is merely rotated in the opposite or counterclockwise direction as seen in FIGS. 1-3 of the drawings. Thus, the rotation of drum 66 in the counterclockwise direction will cause an increased tension in the lower strand of cable 64 between the pulleys 22 and 30, while simultaneously reducing tension and tending to increase the length of the upper strand of cable 64 between the same pulleys 22 and 30. The result of the increased tension in the lower strand between the pulleys 22 and 30 causes a counterclockwise rotation of the entire folded assembly about axis 20. The counterclockwise rotation of the entire folded assembly continues until the first ramp section 12 meets with some stop, such as the platform 16 of the aircraft 18 as seen in FIGS. 1-3 of the accompanying drawings.

If the drum 66 is continued to be rotated in the counterclockwise direction, the tension in the lower strand of the cable 64 between the pulleys 30 and 38 is increased substantially while the tension in the upper strand of the cable 64 between the same pulleys 30, 38 is reduced. The lower strand tends to be shortened in length while the upper strand tends to be extended in length, thus causing a rotation of the remaining folded second, third and fourth sections 24, 34, 44 about axis 28 of rotation in the counterclockwise direction. The counterclockwise directional rotation of the second section 24 and of the folded sections 34, 44 folded thereon, continues until the second section is stopped by its abutment with the first section 12 at the now adjoining edge 25 of the second section 24 and the edge 13 of first section 12.

The continued rotation of drum 66 in the counterclockwise direction will then substantially increase the tension in the lower strands of cable 64 between the pulleys 38 and 46, while substantially reducing the tension in the upper strand of cable 64 between the same pulleys 38, 46. Again, the lower strand of the cable 64 tends to be shortened in length, while the upper strand of the same cable between the same pulleys tends to be extended in length. In such a manner, the third section 34 and the remaining, more remote sections, such as fourth section 44 folded onto third section 34, are rotated about axis 40 in the counterclockwise direction. The counterclockwise movement of third section 34 and more remote sections folded thereon continues until prevented by the abutment of edge 35 of third section 34 with edge 27 of second section 24.

The continued rotation of drum 66 in the counterclockwise direction, as now may be appreciated, then results in an increased tension in the lower strand of cable 64 between the pulley 46 and the point at which the cable is connected with fourth section 44 at adjustable set screw 54. At the same time, a reduced tension is found in the upper strand of cable 64 between the same pulley 46 and the same point. The result of these tensions within the cable 64 causes the fourth section 44 to rotate in a counterclockwise direction about axis 48 of rotation. The counterclockwise movement of fourth section 44 continues until the edge 45 of fourth section 44 abuts with the edge 37 of third section 34. Further counterclockwise rotation of the fourth section 44 is then prevented.

While the fourth section 44 is being rotated about axis 48, the first, second and third sections 12, 24, 34 remain in a stationary position. While the folded third and fourth sections are rotated about axis 40 of rotation, the first and second sections 12, 24 remain stationary. While the second, third and fourth sections 24, 34, 44, folded into adjacent relationship with each other, are rotated jointly about axis 28, the first section 12 remains stationary.

In such a manner the folded ramp assembly as seen in FIG. 3 of the drawings is extended so as to provide a ramp between platform 16 of the aircraft 18 and the lower ground level 60. The extending of the ramp assembly 10 from the fully folded position to the fully extended position is done by rotating the various sections in identical directions about their parallel, corresponding axes of rotations. Further, there is only one axis at any one time about which rotation of the ramp assembly is accomplished. Substantial reduction in the amount of power required to drive the drum 66 is realized. Similarly, when the extended ramp assembly as seen in FIG. 1 of the drawings is folded into a compact folded assembly from the extended positions, the rotation of each of the respective sections into adjacent folded relationship with the other sections, is accomplished by rotation of the sections in an identical direction of rotation about each corresponding axis of rotation. Further, there is only rotation about one axis of rotation at any one time. Thus, efficiencies in power required to drive drum 66 are realized.

An alternative embodiment of the invention can be seen in the illustration of FIG. 8 of the accompanying drawings. Specifically, a first section 90 is seen having stair steps or rungs 92 positioned thereon. Second section 100 abuts at its edge 102 with edge 91 of first section 90. Second section 100 is rotatingly connected to first section 90 by virtue of hinge arrangement 96, of which axis of rotation 98 is a part. Third section 110 in the extended position, as seen in FIG. 8, has its edge 112 abutting edge 106 of the second section 100. Third section 110 is rotatingly connected to second section 100 by hinge arrangement 116, so that third section 110 can rotate about an axis 118 of hinge arrangement 116 in the counterclockwise direction as seen in the view of FIG. 8, until third section 110 can be folded against second section 100.

Thereafter second and third sections 100, 110, folded together against each other, can be rotated about axis 98 until they come into parallel adjacent relationship with first section 90. The axis 98 of rotation is offset somewhat from the first section 90 and second section 100 so that the sections 110 and 100 folded together can be placed in substantially parallel, adjacent relationship when rotated into adjacent relationship with first section 90. First section 90 is affixed to lever 120 which is rotatably connected to the platform 122 of the airplane 124. Lever 120 can rotate about axis 126. When lever 120 is so rotated in the counterclockwise direction as seen in the view of FIG. 8, the folded first section 90, second section 100 and third section 110 can be folded counterclockwise into the aircraft 124, as seen in phantom in the view of FIG. 8.

Cable 130 is shown beginning at a point 132 where it is attached to third section 110. Cable 130 is then wound in a 360° wrap around pulley 114 which rotates about axis 118. Cable 130 is then wound in a 360° wrap around pulley 104 which rotates about axis 102. Cable 130 is then wound around pulley 94 which rotates about axis 93. The cable is then wound back around pulleys 104 and 114, thence is fixed to the third section 110 at the point 132. At each pulley, the return portion of cable 130 is wound in a 360° wrap in the opposite direction of the first wrap similar to the arrangement of cable 64 in the first embodiment described. Pulley 94 can be rotated by a crank 95 connected directly to the pulley 94, or may be rotated by a rotary power source such as an electric motor (not shown).

In operation, the extended ramp assembly as seen in FIG. 8 of the drawings can have its several sections folded onto each other, and the entire folded assembly rotated to within the aircraft 124, as seen in the phantom drawing of FIG. 8. The folding operation is accomplished in a manner substantially similar to the folding of the ramp assembly 10 as seen in the embodiment described in FIGS. 1–7 of the accompanying drawings. Thus, pulley 94 can be rotated in the counterclockwise direction, in the view of FIG. 8. Such rotation causes an increased tension in the upper or right-hand strand of cable 130 between the point 132 and the pulley 114. A lessened tension results in the lower or left-hand strand between the same pulley 114 and point 132. The resulting moment causes a counterclockwise (as viewed in FIG. 8) rotation of third section 110 until it comes into adjacent, parallel relationship with second section 100. The counterclockwise rotation of these folded outboard sections continues until they come into adjacent, substantially parallel relationship with first section 90. Because of the substantial offset of the axis of rotation 98, it will be possible for the second section 100 and the third section 110 to come into substantially parallel relationship when they are brought into adjacent relationship with first section 90. The entire folded assembly may then be placed within the aircraft 124 simply by rotating the folded sections 90, 100, 110 about the axis 126 in a counterclockwise manner until the entire folded assembly rests against a stop or against the platform 122 within the aircraft 124.

To put the folded ramp assembly into an extended position, it is only necessary to rotate the folded assembly about axis 126 in a clockwise direction. Ultimately, the bracket 120 will come to rest against the platform 122. At this time, pulley 94 can be rotated in the clockwise direction to develop an increased tension in the lower or left-hand strand of cable 130 and a decreased tension in the upper or right-hand strand of cable 130 as seen in the view of FIG. 8. This causes a clockwise rotation of folded second section 100 and third section 110 about the axis 98. Clockwise rotation of second section 100 and third section 110 continues until edge 102 of second section 100 comes to rest in adjoining or abutting relationship with edge 91 of first section 90. Further rotation of second section 100 is then blocked until the continued rotation of pulley 94 causes an increased tension in the lower or left-hand strand of cable 130 between the pulleys 104 and 114, while decreasing the tension in the upper or right-hand strand of cable 130 between the same pulleys 104, 114. Such tensional forces, as may be now appreciated, cause a clockwise rotation of third section 110 while second section 100 remains stationary. Section 110 continues in a clockwise rotation until its edge 112 comes into abutting relationship with edge 106 of second section 100, at which time third section 110 cannot rotate further in the clockwise direction. At this time, rotation of pulley 94 can be stopped, and the ramp assembly can be used to convey passengers from a ground level to the platform 122 within the aircraft 124.

Again as in the preferred embodiment described earlier in this specification, it can be seen that rotation is produced about only one axis of rotation at any one time. In such a manner, the torque required to drive pulley 94 in either direction can be substantially reduced, compared to the torque that might be required to rotate all of the sections simultaneously about the respective axes of rotation. Furthermore, the ramp assembly can be folded neatly into adjacent adjoining sections and easily placed within the aircraft 124.

If desired, the ramp sections 90, 100, 110 may be joined to each other at respective abutting edges by virtue of a toggle joint arrangement as is described above, reference being had to FIGS. 6 and 7 of the drawings. In such a manner, the extended sections may be locked into a non-rotating position relative to the next inboard section until the toggle joint is placed in an unlocked position by virtue of abutting arms, such as arms 86, 87 as seen in FIGS. 5 and 6 above.

It will be noted that the hinge brackets connecting the respective ramp sections to their corresponding hinge axes are of different dimensions and configurations in order to accommodate the different spacings between commonly hinged ramp sections in the folded position. Thus hinge brackets 21, 23 are of different lengths and shapes from brackets 31, 33 which in turn are different from brackets 41, 43. The effect of this structural feature may be best seen in FIG. 3. Also, as is apparent in FIG. 3, the respective bracket pairs and the corresponding pulleys are laterally offset from hinge to hinge by virtue of the slight overall taper of the ramp 10 (see FIG. 1) thus facilitating the stowage in minimal space in the folded position.

Although there have been described above specific arrangements of foldable inclined multi-section ramp systems in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Foldable, articulated ramp apparatus comprising in combination:
   at least three separate ramp sections foldable for storage within a vehicle and extendible therefrom, including first and second sections pivotably joined together by a first hinge mechanism for relative rotation about a first hinge axis; and a third section pivotably joined by a second hinge mechanism to the second section outboard of the first section for relative rotation about a second hinge axis;
   a plurality of pulleys individually mounted at respective hinge axes for rotation thereabout;
   cable anchoring means mounted on one of said sections;
   cable driving means mounted inboard of said cable anchoring means relative to the vehicle; and
   a cable extending about each of the pulleys and between the cable anchoring means and the cable driving means for folding and unfolding the ramp sections relative to each other.

2. Apparatus in accordance with claim 1 wherein the cable anchoring means is mounted on the farthest outboard of the ramp sections.

3. Apparatus in accordance with claim 2 wherein the cable driving means comprises a cable drum coupled to a drive motor mounted on the vehicle.

4. Apparatus in accordance with claim 3 wherein the cable comprises an outward portion and a return portion, both extending in generally parallel relationship between the cable anchoring means and the cable drum and being wound about the pulleys in opposite directions at a common hinge axis.

5. Apparatus in accordance with claim 4 wherein the plurality of pulleys comprises first and second pulleys mounted at each hinge axis for rotation thereabout, the outward portion of the cable being wound about each of the first pulleys in succession with at least a 360° wrap in a direction to produce unfolding of the ramp sections and the return portion of the cable being wound about each of the second pulleys in succession with at least a 360° wrap in a direction to produce folding of the ramp sections.

6. Apparatus in accordance with claim 5 wherein the first and second pulleys mounted on a common axis are of equal diameter.

7. Apparatus in accordance with claim 4 wherein each of the pulleys has two distinct cable grooves, one carrying at least one turn of the outward portion of the cable and the other carrying at least one turn of the return portion of the cable.

8. Apparatus in accordance with claim 1 further including pivotable support means mounted on the vehicle for supporting the inboard edge of the first section thereon.

9. Apparatus in accordance with claim 1 further including releasable locking means coupled to a selected hinge mechanism for locking the two sections joined thereby in the unfolded position.

10. Apparatus in accordance with claim 9 wherein the locking means comprises a toggle joint having an over-center link and a release tab connected thereto and further comprising a bracket mounted on the ramp section once removed in the outboard direction from the selected hinge mechanism in a position to bear against the release tab and release the locking means during the folding of said last-mentioned section.

11. Apparatus in accordance with claim 10 further including a lock releasing member mounted on the section once removed from and outboard of the selected hinge mechanism in a position to engage the locking means and release it during folding of the last-mentioned section against the next inboard section.

12. Apparatus in accordance with claim 1 wherein each hinge mechanism includes sets of offset brackets mounting the hinge axis to the adjacent ramp sections, each set of offset brackets being dimensioned to permit the folding of the outboard section associated with a hinge mechanism, together with all other outboard sections folded thereagainst, against the inboard section associated with said hinge mechanism without interference.

13. Apparatus in accordance with claim 1 including means for mounting the pulleys on their respective hinge axes in laterally offset position relative to each other so as to establish clearance between the pulley of one hinge axis relative to another when the ramp is in a folded configuration.

14. Apparatus in accordance with claim 1 wherein each ramp section comprises a generally planar section and the ramp when extended comprises a generally rigid, planar runway supported at a first point on the vehicle adjacent the inboard end and at a second point outboard of said first point, said second point having means for resting on a fixed surface.

15. Apparatus in accordance with claim 1 wherein each ramp section comprises a stairway section, the ramp sections when extended forming a stairway supported at its opposite ends.

16. Apparatus in accordance with claim 1 further including an extendible support means including a support member pivotably mounted to a selected section outboard from the first section and a link member connecting the support member to the next inboard section for pivoting the support member between stowed and operative positions as the selected ramp section is rotated relative to said next inboard section.

17. Apparatus in accordance with claim 16 wherein said link member is connected to rotate the support member to a stowed position folded against the selected ramp section when the selected ramp section is folded against the next inboard section and wherein the support member is dimensioned to engage a fixed support surface and support the selected ramp section when the selected ramp section is in the unfolded position relative to the next inboard section.

18. Cable drive apparatus for driving a series of at least three ramp sections between extended, unfolded and retracted, folded positions wherein each section is hingedly connected in tandem to at least an adjacent section for relative rotation about a hinge axis and including:
 a plurality of pulleys individually mounted on respective ones of said hinge axes;
 a cable wound about said pulleys in succession for folding the ramp sections in a first rotational direction in sequence beginning with the outermost section and for unfolding the ramp sections in the reverse rotational direction; and
 means for controlling the movement of the cable.

19. Apparatus in accordance with claim 18 further including means connected between two adjacent innermost ramp sections for releasably locking said two sections in an unfolded coplanar configuration when the third section is unfolded from its adjacent section, and means affixed to the third section for engaging and releasing the locking means during folding of the third section.

20. Apparatus in accordance with claim 18 further including means for pivotably mounting the innermost ramp section on a vehicle and means for anchoring the cable at its outer end to the outermost ramp section, and wherein the controlling means includes a drive motor and attached cable drum mounted on the vehicle.

21. An actuation system for driving between extended and retracted positions a multiple element apparatus of at least three elements pivotably interconnected by pairs at pivot axes between adjacent pairs of elements comprising:
 a plurality of pulleys individually mounted at respective pivot axes for rotation thereabout;
 cable anchoring means distinct from said pulleys mounted on one of said elements at one end of said apparatus;
 cable driving means mounted adjacent the other end of said apparatus; and
 a cable extending about each of the pulleys in succession and between the cable anchoring means and the cable driving means for folding and unfolding the elements relative to each other, the cable being wound about each pulley in a direction to fold the elements in the same rotational direction about their associated pivot axes during retraction of the apparatus.

22. A system in accordance with claim 21 wherein the cable driving means comprises a cable drum coupled to a drive motor, and a support structure on which the cable drum and motor are mounted.

23. A system in accordance with claim 22 wherein the cable comprises an outward portion and a return portion, both extending in generally parallel relationship between the cable anchoring means and the cable drum and being wound about the pulleys in opposite directions at a common pivot axis.

24. A system in accordance with claim 23 wherein the plurality of pulleys comprises first and second pulleys mounted at each pivot axis for rotation thereabout, the outward portion of the cable being wound about each of the first pulleys in succession with at least a 360° wrap in a direction to produce unfolding of the interconnected elements and the return portion of the cable being wound about each of the second pulleys in succession with at least a 360° wrap in a direction to produce folding of the interconnected elements.

25. A system in accordance with claim 24 wherein the first and second pulleys mounted on a common axis are of equal diameter.

26. A system in accordance with claim 23 wherein each of the pulleys has two distinct cable grooves, one carrying at least one turn of the outward portion of the cable and the other carrying at least one turn of the return portion of the cable.

27. A system in accordance with claim 21 further including releasable locking means coupled to adjacent elements at a selected pivot axis for locking the two elements joined thereby in the unfolded position.

28. A system in accordance with claim 27 wherein the locking means comprises a toggle joint having an over-center link and a release tab connected thereto and further comprising a bracket mounted outboard of said selected pivot axis in a position to bear against the release tab and release the locking means during the folding of said adjacent elements.

29. A system in accordance with claim 21 wherein each pivot axis includes sets of offset pivot members mounting the pivot axis to the adjacent elements, each set of offset pivot members being dimensioned to permit the folding of the outboard element associated with a pivot axis, together with all other elements folded thereagainst, against the inboard element associated with said pivot axis without interference.

30. A system in accordance with claim 21 including means for mounting the pulleys on their respective pivot axes in laterally offset position relative to each other so as to establish clearance between the pulley of one pivot axis relative to another when the apparatus is in a folded configuration.

31. A system in accordance with claim 21 further including an extendible support means including a support member pivotably mounted to a selected outboard element and a link member connecting the support member to the next inboard element for pivoting the support member between stowed and operative positions as the selected element is rotated relative to said next inboard element.

32. A system in accordance with claim 31 wherein said link member is connected to rotate the support member to a stowed position folded against the selected element when the selected element is folded against the next inboard element and wherein the support member is dimensioned to engage a fixed support surface and support the selected element when the selected element is in the unfolded position relative to the next inboard element.

* * * * *